Sept. 16, 1930.                A. J. VANCE                1,776,014
                    AIR AND VAPOR CONTROL FOR DRIERS
                    Filed March 21, 1929        2 Sheets-Sheet 1
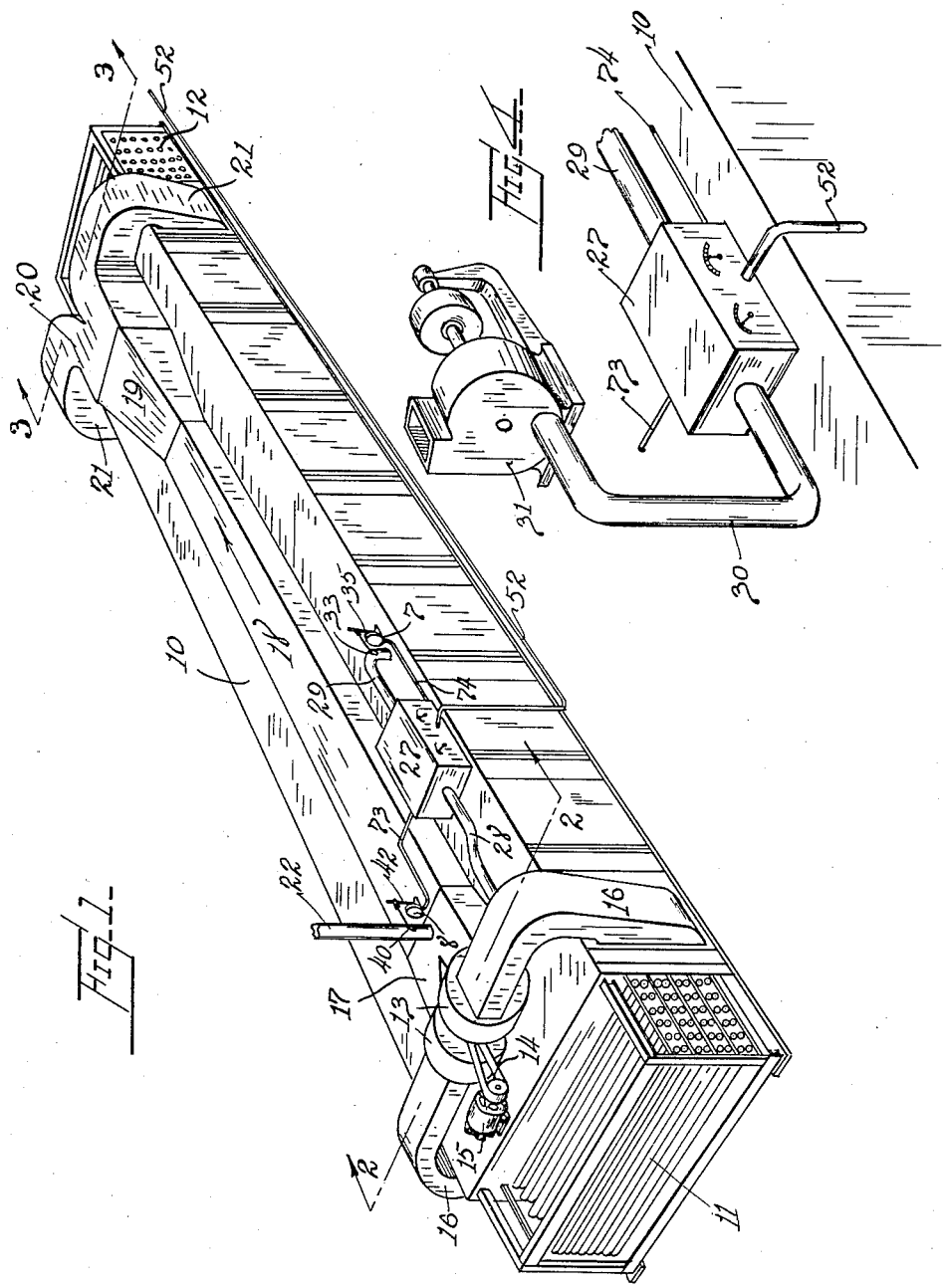
Inventor
Arthur J. Vance
Kerr Hudson + Kent
Attys Sept. 16, 1930.  A. J. VANCE  1,776,014
AIR AND VAPOR CONTROL FOR DRIERS
Filed March 21, 1929   2 Sheets-Sheet 2
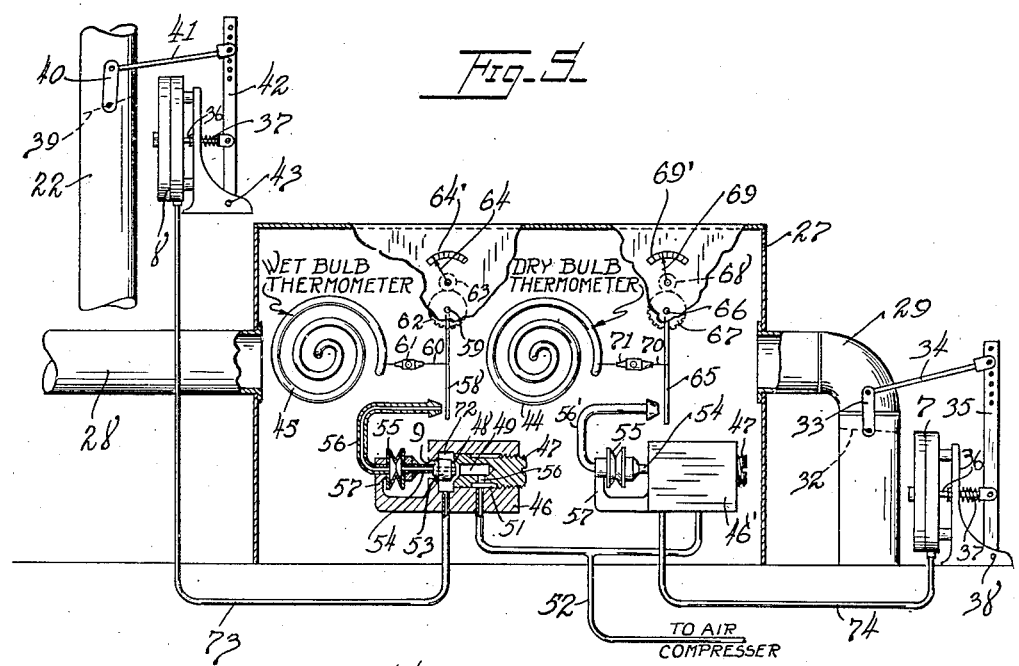
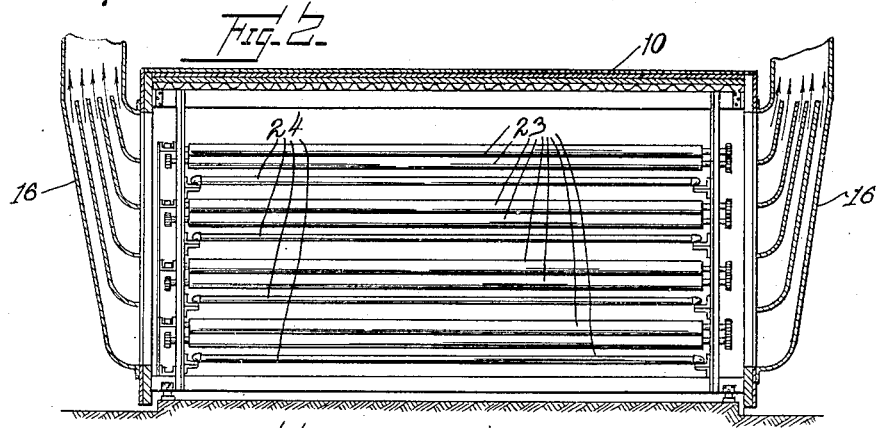
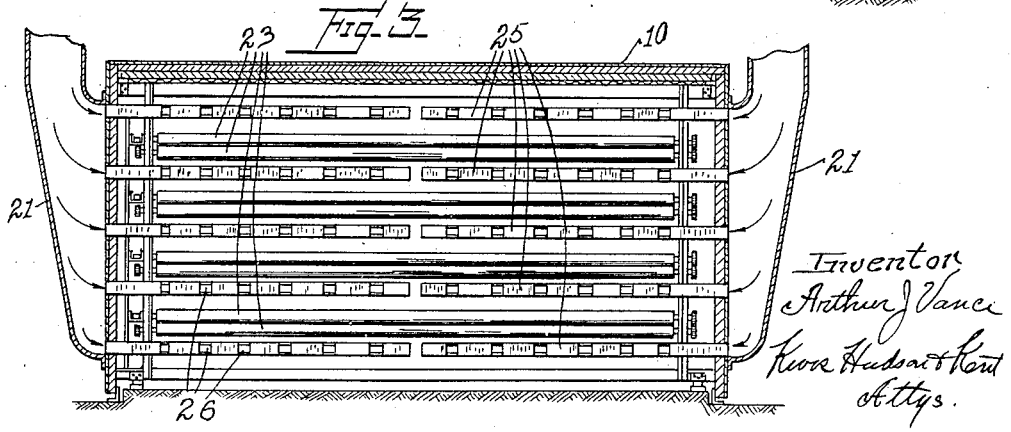

Patented Sept. 16, 1930

1,776,014

UNITED STATES PATENT OFFICE

ARTHUR J. VANCE, OF PAINESVILLE, OHIO, ASSIGNOR TO THE COE MANUFACTURING COMPANY, OF PAINESVILLE, OHIO, A CORPORATION OF OHIO

AIR AND VAPOR CONTROL FOR DRIERS

Application filed March 21, 1929. Serial No. 348,777.

This invention relates to improvements in air and vapor control for driers, and involves a method and means for determining the relative proportions of air and steam vapor in a high temperature drier, and automatically controlling the proportions of each.

In driers operating at temperatures below 212° F. the drying medium is generally composed of air carrying more or less moisture in the form of vapor. The capacity of the air for carrying this vapor varies directly with the temperature so long as the temperature does not rise above the boiling point of water. Where temperatures under 212° F. are maintained it is a relatively simple matter to measure the humidity or relative humidity of the drying medium, and this is commonly done by the use of instruments known as wet and dry bulb thermometers. These instruments comprise two thermometers, one of the ordinary type called the dry bulb thermometer, and the other having a wick surrounding its bulb, the wick extending into a water well so as to be kept moist. This latter thermometer is called the wet bulb thermometer. Evaporation of the water in the wick surrounding the bulb takes place, unless the air is already saturated, evaporation being fast in case the air is dry and its speed decreasing as the moisture content of the air increases. This evaporation cools the bulb of the wet bulb thermometer more or less, depending upon the speed of evaporation, which results in a temperature indication which is below the indication of the dry bulb thermometer. The difference in temperature readings from the two thermometers is a measure of the moisture content of the air for the given dry bulb temperature. The relative humidity of the air in the drier being known, controls may be operated manually or automatically to discharge more or less of the used drying medium and admit more or less fresh air in order to bring the moisture content of the drying medium to such a point that it will be efficient as a drying agent. It is important however to discharge no more than the necessary amount of drying medium, because the heat contained in the discharged medium is necessarily lost.

The above applies at the present time only to driers operating at less than 212° F. It is desirable in many classes of work to employ heats above 212° F., but in such cases the method of determining the moisture content explained above is no longer available because the wet bulb thermometer does not function above 212° F., that is the moisture in the wick then boils off forming steam and the rapidity of the boiling is dependent upon the temperature only, being unaffected by the amount of moisture in the medium. In fact the medium is not then air containing vapor, but rather it is a mixture of air and steam. Hence the methods of measuring moisture content applicable to driers working at temperatures below 212° F. cannot be utilized in driers working at temperatures above 212° F.

One of the objects of the present invention therefore is the provision of a method and means for measuring the moisture content in a drying medium working at a temperature above 212° F.

Another object is the provision of a method and means for so measuring the moisture content, embodying the known wet and dry bulb thermometer instruments previously employed for drying mediums maintained at temperatures below 212° F.

Still another object is the control automatically of the moisture content in a drier working at a temperature above 212° F.

Other objects and features of novelty will appear as I proceed with the description of that embodiment of the invention which, for the purposes of the present application, I have illustrated in the accompanying drawings, in which Figure 1 is a perspective view of a veneer drier in which the invention is employed.

Figs. 2 and 3 are cross sectional views of the wet and dry ends respectively of the apparatus illustrated in Fig. 1, these views being taken substantially on the lines 2—2 and 3—3 respectively of Fig. 1.

Fig. 4 is a perspective view illustrating a modified means for inducing flow of sample drying medium through the instrument box; and Fig. 5 is a diagrammatic view of the instrument box with its contents and connections.

Referring first to Fig. 1 of the drawing, 10 is the casing of a drier for the treatment of wood veneer, composition board and the like. At the intake or "wet" end of the drier there is a bank of rolls 11, by means of which the material to be dried is fed into the machine at a number of different levels. At the delivery or "drying" end of the machine the dry material is fed onto a cooling rack 12, which may also be composed of rolls in tiers.

At the wet end a pair of blowers 13 are set with their shafts in alignment, or with a common shaft, these blowers being driven by a belt 14 from a motor 15 or other prime mover. These blowers are connected at their intake sides with manifolds 16 that are in communication with the interior of the drier. Drying medium is thus drawn from the two sides of the casing by the blowers 13, which deliver it into the two legs of a V-shaped housing 17 that is connected with one extremity of a conduit 18 running along the top of the casing 10. The opposite end of this conduit is connected with an air heater 19 in which the air or mixture of air and steam is reheated by any suitable means. The heater 19 is in turn connected with a double armed conductor 20 extending to the sides of the casing and terminating in a pair of manifolds 21 that are in communication with the interior of the casing 10 at its dry end.

The blowers 13 thus produce a circulation of drying medium through the housing 17, conduit 18, heater 19, double armed conductor 20 and manifolds 21 into the dry end of the casing, backwardly through the casing to the wet end and out through the manifolds 16 to the intake sides of the blowers, thus completing the circuit. The particular form and arrangement of the parts thus far described do not affect the subject matter of the invention however, and various other known forms and arrangements could be employed.

Since the board must enter and leave the drier at the ends thereof, no effort is made, in the form of drier illustrated herein, to maintain air-tight joints at the ends of the drier, but more or less leakage at these points is permitted, and the pressure within the drier is kept slightly sub-normal while that within the conduit 18 is slightly above normal. 22 is a stack or pipe of limited cross section in communication with housing 17. Through this stack a portion of the drying medium leaving the blowers 13 may be diverted to the atmosphere. When this diversion takes place, pressure within the casing 10 is further reduced and fresh air flows in through the openings in the ends of the casing to take the place of the diverted air and steam mixture. The foregoing is common practice.

Fig. 2 shows pairs of feeding rolls 23 arranged in four tiers, these rolls being employed throughout the length of the casing, and some or all of them being driven in any suitable manner to cause the board to be fed forward between the rolls of each pair. The casing is heated, preferably by steam coils 24 extending between and supported by the side walls of the casing and arranged preferably directly beneath the lower roll 23 of each pair.

Each of the manifolds 21, as shown in Fig. 3, is connected with a series of five distributing pipes 25, each of the superposed paths taken by the board having a pipe 25 both above and below it. These pipes 25 are provided on their inner sides with holes 26 through which the heated drying medium is delivered to the casing.

In proximity to the casing 10, preferably directly above it as shown in Figs. 1 and 4, I mount an instrument box 27, preferably made of metal and exposed to the air on several sides so as to give off heat readily. The box 27 is connected on one side by means of a conductor 28 with one of the manifolds 16, and on the opposite side by means of a conductor 29 with the interior of the casing 10. In this manner the flow of a comparatively small stream of drying medium from the casing through the box 27 is induced by one of the blowers 13, this being a mere shunting of a portion of the medium in its circulation. As shown in Fig. 4 however I may substitute for the conductor 28 a pipe 30 leading to a separate small size blower 31 exhausting into the atmosphere, in which event the stream of sample medium which is caused to flow through the box 27 is lost to the system.

In the conductor 29 I mount a damper 32 which may be adjusted to reduce to any desired extent, or to entirely cut off, the flow of drying medium from the casing 10 through the box 27. The operation of the damper may be effected by means of a crank 33 to the outer end of which is pivoted a link 34 that is adjustably connected with a lever 35 arranged to be actuated by a diaphragm motor 7. This motor is a device well known in the art and comprises a chamber adapted to be expanded by the application internally of fluid pressure, such expansion pulling upon a rod 36 against a compression spring 37 to rock lever 35 about its pivot 38, moving damper 32 toward closed position.

In the stack or pipe 22 there is a damper 39 carrying a crank 40 which is connected by a link 41 with a lever 42 pivoted at 43. The lever 42 is likewise part of a diaphragm motor 8, having a rod 36 and a spring 37 and operating in precisely the same manner as the motor 7.

Within the instrument box 27 I mount a dry bulb thermometer 44 and a wet bulb thermometer 45, these instruments being illustrated diagrammatically in Fig. 5. Assuming that they are metallic spiral tubes filled with gas, an increase in temperature will cause them to expand, while a decrease will cause them to contract. I utilize this expansion and contraction to operate the controls for my apparatus. 46 and 46′ are valve casings, in each of which is mounted a plug 47 carrying a valve seat 48 communicating with an axial bore 49 that is connected by a radial passage 50 with an annular passage 51 around the periphery of the plug. This latter passage is in constant communication with a compressed air supply pipe 52.

A double ended valve piece 53 is adapted to engage the seat 48 or to be disengaged therefrom and to close a port 9 in the valve casing 46 or 46′, as the case may be. The valve piece 53 has a drilled opening therethrough to receive with a snug fit a short tube 54 upon which the valve piece is carried. This tube is secured to one side of a bellows 55, and is movable back and forth as the bellows contracts and expands. The opposite end of the bellows is fixed upon a tube 56 or 56′, as the case may be, that is rigidly supported by an arm 57 of the casing 46 or 46′. When the bellows 55 expands, the valve piece 53 engages its seat 48. When the bellows 55 is contracted the valve piece leaves its seat 48 and closes the port 9.

The end of tube 56 may be closed by a strip or plate 58 of flexible material which is attached to a shaft 59 pivotally mounted in the sides of the box 27, the plate 58 being connected with the free end of the thermometer 45 by a link 60 which is adjustable as to length by any suitable means, such as a turnbuckle 61. On the shaft 59 is a gear 62 meshing with a smaller gear 63 that is rigidly connected with the hand 64 of a temperature gauge 64′ for the wet bulb thermometer.

The end of tube 56′ is adapted to be closed by a strip or plate 65 mounted on a shaft 66 carrying a gear 67 meshing with a gear 68 that is rigid with the hand 69 of a temperature gauge 69′ for the dry bulb thermometer, the plate 65 being connected with the free end of thermometer 44 by a link 70 including a turnbuckle 71.

In each of the valve casings 46 and 46′ there is an annular chamber 72 surrounding the valve piece 53 and in communication with either the bore 49 or the port 9, depending upon the position of the valve. A fluid pressure duct 73 connects one of these chambers 72 with the diaphragm motor 8. The other chamber 72 is connected by a similar duct 74 with the diaphragm motor 7.

*Operation.*—When a board drier of the type here illustrated is first put into operation it contains air and no other fluid. The board passing through the machine gives up its moisture on account of the heat maintained inside of the casing, and since the temperature in the casing exceeds 212° F. this moisture is converted into steam, and the temperature of the steam is raised to the temperature of the air in the casing. Thus the air with which the operation started is gradually displaced by a mixture of air and steam. Of course, considerable energy must be expended in order to maintain the desired high temperature in the drier, which is an impelling reason for recirculating the drying medium instead of replacing it completely with dry air after one circuit of the machine. On the other hand the drying medium, in order to operate efficiently, must not have too great a moisture content. There is a point at which these two opposing factors must meet to provide the most efficient operation of the drier. This point varies more or less with different materials being handled, and with the temperature maintained in the drier, but it is highly important to maintain the proper moisture content when once it has been determined for a given material and drier temperature.

After my machine is put in operation, the blowers 13 produce a slight pressure in the conductor 18 and a slight suction in the drier casing 10 thus starting a flow of air in a circuit through the casing and back through the conductor 18. The drying medium thus circulates for a time without any introduction of fresh air, that is until the moisture content due to the evaporation of water from the material being dried, is brought up to the point for which the control mechanism is set. During such time the damper 39 is closed, and no drying medium leaves the system. Sample drying medium is however passing through the instrument box 27. The dry bulb thermometer control mechanism is set to maintain some predetermined temperature below 212° F. in the box 27. This temperature may be 180°, for example. While the temperature within the box is below that figure the flexible strip or plate 65 closes the end of tube 66′. Compressed air entering the casing 46′ through pipe 52 flows through bore 49 and through the drilled opening in valve piece 53 into the short tube 54, expanding the bellows 55. Since the left side of the bellows is prevented from movement by the arm 57, the right side moves and causes the valve piece to engage the seat 48. The port 9 in the casing 46′ is thus opened, thereby connecting duct 74 with atmosphere and shutting it off from the axial bore 49. Any pressure air within the diaphragm motor 7 is thus exhausted, and the spring 37 of that motor is permitted to act. The lever 55 is thereby swung to the right, opening damper 32. When this occurs the suction created in pipe 28 or 30, as the case may be, draws sample fluid from the casing 10 through the pipe 29 and through the box 27. This box, being constructed of metal or other good heat conducting material and not insulated, is cooled by the atmosphere which surrounds it. The temperature of the medium flowing through it is thereby reduced. When this temperature rises however, the thermometer 44 expands and the tension of plate 65 is gradually relieved and finally when the temperature reaches 180° F., or other predetermined point, the plate 65 moves away from the end of tube 56'. The pressure within the corresponding bellows 55 is thereby relieved and that bellows collapses, whereupon the valve piece 53 moves to the left closing the port 9 of the casing 46' and opening the annular chamber 72 to the bore 49. Compressed air then enters the duct 74 and the diaphragm motor 7 expands pulling the lever 35 to the left against the action of spring 37. The damper 32 is thus drawn toward closed position and the rate of flow of sample drying medium from the casing 10 into the box 27 is reduced. The temperature within the box 27 is thereby correspondingly reduced. In this manner the temperature within the box is maintained at all times within a given narrow range. Any suitable means for varying the setting of the dry bulb thermometer may be employed, the turnbuckle 71 being merely a convenient means for indicating such adjustment.

When the machine is first set in operation there is of course very little moisture in the drying medium, and consequently no occasion for discharging part of that medium through the pipe or stack 22. The wet bulb thermometer 45 operating in a fluid maintained at a given temperature, shows a reading considerably below that temperature at the beginning of the operation of the machine when the moisture content is low, and at such times the evaporation of water around the bulb is relatively rapid, and hence the bulb is cooled considerably. The tube 56 is therefore closed by the flexible plate 58 and pressure is built up in corresponding bellows 55, opening up the duct 73 to atmosphere through the port 9. The diaphragm motor 8 is therefore collapsed, and its spring 37 is free to act to move lever 42 to the right, thereby closing the damper 39. Hence there is no discharge of drying medium from the system and the proportion of steam is permitted to gradually increase, which it does owing to the constant movement of wet material into the drier casing. Now when the moisture content finally rises to the proportion at which the wet bulb is set to act, the plate 58 will leave the end of tube 56, permitting the corresponding bellows 55 to collapse and draw the valve piece 53 over to the left, closing the port 9 and opening duct 73 to admit compressed air, which expands diaphragm motor 8, pulling lever 42 to the left to swing damper 49 toward open position. A portion of the drying medium is thereby deflected through the pipe 22 to atmosphere, and a corresponding amount of fresh air leaks into the casing 10 through the openings at the ends thereof. Presently the proportion of air becomes too great, and then the plate 58 again closes the tube 56, which results in the movement of damper 39 again toward closed position, cutting down the escape of the air and steam mixture, and this automatic operation of the damper in response to the winding and unwinding of the wet bulb thermometer continues throughout the operation of the drier. The setting of this thermometer may be effected by the operation of the turnbuckle 61 or any other suitable adjusting means.

The gauge hands 64 and 69 register the temperatures of the two bulbs 45 and 44 respectively, and serve as an indication to the operator of the setting of the two thermometers, enabling him to make adjustments with precision.

In the foregoing description and accompanying drawings I have disclosed my invention with considerable particularity, but I desire it to be understood that such detailed disclosure is primarily for the purpose of fully illustrating the invention, and is not to be construed as constituting a limitation upon the scope thereof.

Having thus described my invention, I claim:

1. In a drier, a casing, means for circulating a drying medium therethrough, means for maintaining the temperature in said casing above 212° F., an instrument box, means for withdrawing a portion of the said circulating medium and directing it into said box, means for maintaining the temperature in said box below 212° F., means within said box responsive to the moisture content of the fluid therein, and means controlled by said last named means for regulating the discharge of drying medium from the system and the admission of fresh drying medium thereto.

2. In a drier, a casing, means for circulating a drying medium therethrough, means for maintaining the temperature in said casing above 212° F., an instrument box, means for withdrawing a portion of the said circulating medium and directing it into said box, means for maintaining the temperature in said box below 212° F., a wet bulb thermometer in said box, and means controlled by said thermometer for regulating the discharge of the drying medium from the system, and the admission of fresh drying medium thereto.

3. In a drier, a casing, means for circulating a drying medium therethrough, means for maintaining the temperature in said casing above 212° F., an instrument box, means for withdrawing a portion of the said circulating medium and directing it into said box, means for maintaining the temperature in said box below 212° F., means within said box responsive to the moisture content of the fluid therein, and means controlled by said last named means for regulating the discharge of drying medium from the system and the admission of fresh drying medium thereto, and means for registering the temperature and moisture content of the fluid in said box.

4. In a drier, a casing, means for circulating a drying medium therethrough, means for maintaining the temperature in said casing above 212° F., an instrument box, means for directing a portion of said circulating medium into said box, a dry bulb thermometer in said box, means controlled by said thermometer for maintaining the temperature in said box below 212° F., a wet bulb thermometer in said box, and means controlled by said wet bulb thermometer for regulating the discharge of drying medium from the system and the admission of fresh medium thereto.

5. In a drier, a casing, means for circulating a drying medium therethrough, means for maintaining the temperature in said casing above 212° F., an instrument box, means for directing a portion of said circulating medium into said box, a dry bulb thermometer in said box, means controlled by said thermometer for maintaining the temperature in said box below 212° F., a wet bulb thermometer in said box, and means controlled by said wet bulb thermometer for regulating the discharge of drying medium from the system and the admission of fresh medium thereto, said dry and wet bulb thermometers having registering means.

6. In a drier, a casing, means for circulating a drying medium therethrough, means for maintaining the temperature in said casing above 212° F., an instrument box, means for causing a portion of said circulating medium to flow through said box, means for maintaining the temperature in said box below 212° F., means within said box responsive to the moisture content of the medium passing therethrough, and means controlled by said last named means for regulating the discharge of drying medium from the system and the admission of fresh drying medium thereto.

7. In a drier, a casing, means for circulating a drying medium therethrough, means for maintaining the temperature in said casing above 212° F., an instrument box mounted outside of said casing, means for causing a portion of said circulating medium to flow through said box, means responsive to the temperature within said box for controlling the rate of flow of the medium passing therethrough, whereby the temperature within the box is automatically maintained within a given range, means within the said box responsive to the moisture content of the medium passing therethrough, and means controlled by said last named means for regulating the discharge of drying medium from the system and the admission of fresh drying medium thereto.

8. In a drier, a casing adapted to receive material to be dried at one end and discharge it at the other end, said ends being slightly open to permit leakage of air into the casing, means for circulating a drying medium through the casing while maintaining therein a slightly sub-atmospheric pressure, means for maintaining the temperature in said casing above 212° F., an instrument box mounted outside of said casing, means for withdrawing a portion of said circulating medium and directing it into said box, means for maintaining the temperature in said box below 212° F., means within said box responsive to the moisture content of the fluid therein, and means controlled by said last named means for regulating the rate of discharge of drying medium from the system.

9. In mechanism of the class described, a drier casing, an instrument box exposed to cooling fluid, and means for maintaining a constant temperature in said box below the minimum temperature in said casing; said means comprising a conductor leading from the casing to the box, means for inducing flow of fluid through said box and casing, temperature responsive means within said box, and mechanism adapted to be actuated by said temperature responsive means for controlling the rate of flow of said fluid.

10. A method of determining the moisture content of the fluid in a drier, where the temperature in the drier exceeds 212° F., which consists in abstracting a portion of the fluid from the drier, cooling it down to a temperature less than 212° F., and measuring the moisture content of the abstracted fluid by means of dry bulb and wet bulb thermometers.

11. A method of controlling the moisture content of the fluid in a drier where the temperature in the drier exceeds 212° F., which consists in causing a portion of the fluid to leave the drier, cooling said portion down to a temperature of less than 212° F., and controlling the discharge of used fluid and the admission of fresh fluid to the system by means responsive to the moisture content in said cooled portion.

12. A method of controlling the moisture content of a fluid in a drier where the temperature in the drier exceeds 212° F., which consists in diverting a portion of the fluid from said drier, maintaining said diverted fluid at a temperature less than 212° F., within a narrow range, and controlling the rate of discharge of used fluid and the rate of admission of fresh fluid to the system by means responsive to the moisture content in said cooled portion.

In testimony whereof, I hereunto affix my signature.

ARTHUR J. VANCE.